Patented Feb. 24, 1925.

1,527,900

UNITED STATES PATENT OFFICE.

WILHELM MOSER AND HUGO SIEBENBÜRGER, OF BASEL, SWITZERLAND, ASSIGNORS TO THE SOCIETY OF CHEMICAL INDUSTRY IN BASLE, OF BASEL, SWITZERLAND.

VAT DYESTUFF AND PROCESS FOR MAKING SAME.

No Drawing.    Application filed December 11, 1923.   Serial No. 680,034.

*To all whom it may concern:*

Be it known that we, WILHELM MOSER, citizen of the German Republic, and HUGO SIEBENBÜRGER, a citizen of the Swiss Republic, both residing at Basel, Switzerland, have invented a new and useful Vat Dyestuff and Process for Making the Same, of which the following is a full, clear, and exact specification.

The present invention relates to a new vat dyestuff. The invention comprises the new dyestuff, the process for making the same, as well as the material dyed with the new dyestuff.

It has been found that a new vat dyestuff can be obtained by treating the 2-aminoanthraquinone-3-carboxylic acid with caustic alkalies, preferably in the presence of an organic fluxing material, for example alcohol, paraffin, glycerine, aniline, xylidine, and the like, and then subjecting the product of reaction to a purifying process. This purifying process may be effected in the following manner:

(a) by treating the raw product with strong sulphuric acid;

(b) by treating the raw product with oxidizing agents and then with alkalies;

(c) by treating the raw product with alkaline reducing agents and separation of the hydro compound.

There is thus obtained a new dyestuff which forms a black-blue powder having a slight copper lustre. It dissolves in concentrated sulphuric acid to an olive solution, in oleum to a yellow-brown solution, and is precipitated from these two solutions by means of water in the form of bright greenish-blue flocks. In nitrobenzene it is but sparingly soluble to a yellow solution. With hydrosulphite it yields a black-blue vat from which cotton is dyed in clear green-blue tints of quite prominent fastness to washing, to chlorine, and to light.

The formation of the dyestuff most probably occurs according to the following summary equation:

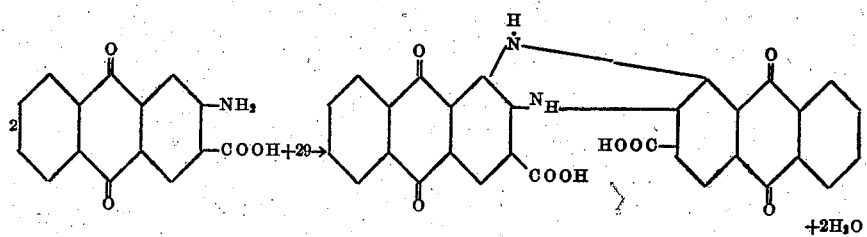

and the new dyestuff is most probably to be considered as the 3:3'-dicarboxylic acid of the N-dihydro-1:2, 1':2'-anthraquinoneazine.

Example 1.

10 parts of 2-aminoanthraquinone-3-carboxylic acid are introduced, at 200 to 210° C. into 30 parts of melted caustic potash. The mass is then heated for ¼ to ½ hour, while stirring, to 210 to 230° C. The fusion mass obtained is boiled with water, whereby the dyestuff, mixed with other substances, is precipitated. It is separated by suction and washed.

The raw product thus obtained is heated to boiling with dilute nitric acid and kept at the boiling temperature for ¼ hour. The color changes from blue-black via yellow-green to red-brown. The cooled liquid of reaction is then filtered and the residue is washed to render it free from acid. The yellow-green product obtained is freed from the soluble by-products by boiling with alkalies, separation by suction, and thorough washing with water, whereby simultaneously re-formation of the blue-black dyestuff occurs. The product thus obtained is then dried.

Example 2.

10 parts of 2-aminoanthraquinone-3-carboxylic acid are introduced, at 200 to 210° C, into 30 parts of melted caustic potash. The mass is then heated for ¼ to ½ hour, while stirring, to 210 to 230° C. The fusion mass obtained is boiled with water, whereby the dyestuff, mixed with other substances, is precipitated. It is separated by suction and washed.

The product thus obtained is made into a paste to which some caustic soda solution is added. The mass is warmed to about 40° C. and dissolved by adding the necessary quantity of hydrosulphite. The temperature is maintained at 40° C. for one hour to 1½ hours. From the blue-black vat the hydrocompound soon separates. The latter is filtered off and free from soluble by-products by washing with alkaline water under addition of some hydrosulphite. The pure hydrocompound is then suspended in water, a current of air blown through, filtered, washed, and dried.

Example 3

80 parts of caustic potash and 100 parts of alcohol are heated in a vessel provided with a descending cooler, while stirring, until the interior temperature has reached 140 to 145° C. and a homogeneous, clear fusion mass has been obtained. There are then added 20 parts of 2-aminoanthraquinone-3-carboxylic acid and the stirring continued for one hour at 140 to 150° C. The fusion mass obtained is boiled with water whereby the dyestuff separates. The mass is then filtered, washed, and dried.

The dried raw dyestuff is suspended in nitrobenzene, the dyestuff suspension heated to 140 to 145° C. and a moderate current of chlorine gas passed through at this temperature, whereby transformation into a yellow product occurs. After cooling the product is filtered, washed first with nitrobenezene and then with alcohol, and then suspended in water. The suspension is mixed, as indicated in Example 1, with caustic soda solution or soda, respectively, and boiled, whereby the blue-black dyestuff is re-formed. By filtration and thorough washing the dyestuff is freed from alkali-soluble by-products and then dried. The product obtained is free from chlorine.

If, in this example, the chlorine is substituted by the corresponding quantity of antimony pentachloride, the same result is obtained.

Example 4.

20 parts of 2-aminoanthraquinone-3-carboxylic acid are boiled in a reflux apparatus for one hour with 20 parts of caustic potash in 150 parts of aniline, whereupon the main quantity of the aniline is distilled off. The remaining fusion mass is freed from the still adhering aniline by passing a current of steam through the mass, whereupon the dyestuff is separated out by boiling in water. It is then filtered and dried.

10 parts of the dyestuff thus obtained are dissolved at ordinary temperature in 40–80 parts of monohydrate and then mixed, while stirring well, dropwise with so much water that the sulphuric acid finally has a concentration of 90 per cent. The temperature must not be allowed to rise above 90° C. during this operation. After cooling the product is filtered and washed, first with sulphuric acid of 70–80 per cent strength, and then with water, and dried.

Example 5.

40 parts of 2-aminoanthraquinone-3-carboxylic acid are introduced, portion by portion, into a fusion mass of 160 parts of caustic potash mixed with 10 parts of aniline, heated to 170° C. The temperature is raised to 180° C. and the mass is stirred during one hour at 180 to 185° C. The fusion is poured into water and the dyestuff precipitated by boiling. It is then filtered, washed with water, and dried.

10 parts of the dyestuff thus obtained are dissolved in 100 parts of monohydrate and slowly mixed with so much water that the concentration of the sulphuric acid finally reaches 85 per cent whereby care must be taken that the temperature does not exceed 90° C. The pure dyestuff separates in form of small, blue needles having a copper lustre. It is isolated as indicated in Example 4.

What we claim is:

1. As a new process the herein described manufacture of a new vat dyestuff, consisting in fusing the 2-aminoanthraquinone-3-carboxylic acid with caustic alkalies, and then subjecting the product of reaction to a purifying process.

2. As a new process the herein described manufacture of a new vat dyestuff, consisting in fusing the 2-aminoanthraquinone-3-carboxylic acid with caustic alkalies in the presence of an organic fluxing material, and then subjecting the product of reaction to a purifying process.

3. As a new process the herein described manufacture of a new vat dyestuff, consisting in fusing the 2-aminoanthraquinone-3-carboxylic acid with caustic alkalies in the presence of an aromatic amine, and then subjecting the product of reaction to a purifying process.

4. As a new process the herein described manufacture of a new vat dyestuff, consisting in fusing the 2-aminoanthraquinone-3-carboxylic acid with caustic alkalies in the presence of a primary aromatic amine, and then subjecting the product of reaction to a purifying process.

5. As a new process the herein described manufacture of a new vat dyestuff, consisting in fusing the 2-aminoanthraquinone-3-carboxylic acid with caustic alkalies in the presence of a primary aromatic amine, and then treating the product of reaction with strong sulphuric acid.

6. As a new process the herein described manufacture of a new vat dyestuff, consisting in fusing the 2-aminoanthraquinone-3- carboxylic acid with caustic alkalies in the presence of a primary aromatic amine, dissolving the product of reaction in monohydrate, and separating the same again by diluting the monohydrate with water under avoidance of too great a rise of the temperature.

7. As a new product the herein described new vat dyestuff which most probably is to be considered as the 3:3'-dicarboxylic acid of the N-dihydro-1:2, 1':2'-anthraquinoneazine, which forms a black-blue powder having a slight copper lustre, dissolving in concentrated sulphuric acid to an olive, and in oleum to a yellow-brown solution, separating therefrom with water as bright greenish-blue flocks, only sparingly soluble in nitrobenzene to a yellow solution, yielding with hydrosulphite and caustic soda solution a black-blue vat from which cotton is dyed in clear green-blue tints of quite prominent fastness to washing, to chlorine, and to light.

In witness whereof we have hereunto signed our names this 24th day of November, 1923, in the presence of two subscribing witnesses.

WILHELM MOSER.
HUGO SIEBENBÜRGER.

Witnesses:
  AMAND BAUM,
  LUCIEN PICARD.